(12) United States Patent
Verdun, Sr.

(10) Patent No.: US 10,259,517 B2
(45) Date of Patent: Apr. 16, 2019

(54) HORN SYSTEM

(71) Applicant: Randy Verdun, Sr., Denham Springs, LA (US)

(72) Inventor: Randy Verdun, Sr., Denham Springs, LA (US)

(73) Assignee: Detail Specialties, LLC, Denham Springs, LA (US)

( * ) Notice: Subject to any disclaimer, the term of this patent is extended or adjusted under 35 U.S.C. 154(b) by 0 days.

(21) Appl. No.: 15/612,954

(22) Filed: Jun. 2, 2017

(65) Prior Publication Data

US 2017/0352341 A1    Dec. 7, 2017

Related U.S. Application Data

(60) Provisional application No. 62/345,605, filed on Jun. 3, 2016.

(51) Int. Cl.
*B62J 3/00* (2006.01)
*G10K 9/00* (2006.01)
*G10K 9/04* (2006.01)
*G10K 11/00* (2006.01)

(52) U.S. Cl.
CPC .................... *B62J 3/00* (2013.01); *G10K 9/00* (2013.01); *G10K 11/004* (2013.01); *G10K 9/04* (2013.01)

(58) Field of Classification Search
CPC .......... G10K 9/04; G10K 9/00; G10K 11/004; B62J 3/00
USPC ....... 116/3, 59, 137 R, 142 FP, 142 FV, 139, 116/142 R; 248/298.1, 230.3; D10/114.9, 120; 137/316; 280/495, 502
See application file for complete search history.

(56) References Cited

U.S. PATENT DOCUMENTS

| | | | | |
|---|---|---|---|---|
| D46,672 S | * | 11/1914 | Hawthorne | D10/120 |
| 1,246,119 A | * | 11/1917 | Larson | B60J 3/0217 116/142 R |
| D52,941 S | * | 2/1919 | Aufiero | 340/384.1 |
| 1,336,594 A | * | 4/1920 | Sparks | G10K 9/10 116/144 |
| 1,351,223 A | * | 8/1920 | Voight | G10K 9/10 116/144 |
| 1,391,688 A | * | 9/1921 | Marsico | B60Q 5/00 248/300 |
| 1,400,007 A | * | 12/1921 | Sparks | B60Q 5/00 248/300 |
| 1,433,593 A | * | 10/1922 | Atkocaitis | B60Q 5/00 116/59 |
| 1,519,223 A | * | 12/1924 | Seiss | B60Q 5/00 248/207 |
| 1,543,454 A | * | 6/1925 | Sparks | B60Q 5/00 248/298.1 |
| 1,543,455 A | * | 6/1925 | Sparks | B60Q 5/00 248/298.1 |

(Continued)

*Primary Examiner* — Lisa M Caputo
*Assistant Examiner* — Tania Courson
(74) *Attorney, Agent, or Firm* — John B. Edel; Edel Patents LLC

(57) ABSTRACT

Horn systems having a first bracket, a second bracket, a compressor and a horn are described. The horns may have a sound unit and a bell with tubing connecting the compressor and the sound unit. The tapered neck of the horn's bell may be secured by the second bracket surrounding the tapered neck and fixing it in position when the second bracket is secured relative to the first bracket.

8 Claims, 4 Drawing Sheets

(56) References Cited

U.S. PATENT DOCUMENTS

| | | | | | |
|---|---|---|---|---|---|
| 1,616,173 A | * | 2/1927 | Benson | | B60N 3/14 |
| | | | | | 219/267 |
| 1,684,895 A | * | 9/1928 | Sparks | | G10K 9/18 |
| | | | | | 116/142 FP |
| 1,698,804 A | * | 1/1929 | Sparks | | G10K 9/18 |
| | | | | | 116/142 FP |
| 1,746,034 A | * | 2/1930 | Farmer | | G10K 9/04 |
| | | | | | 116/142 FP |
| 1,915,248 A | * | 6/1933 | Horton | | G10K 9/04 |
| | | | | | 116/142 FV |
| 1,936,850 A | * | 11/1933 | Middleton | | B60Q 5/00 |
| | | | | | 248/288.11 |
| 2,084,674 A | * | 6/1937 | Down | | B60Q 5/00 |
| | | | | | 116/137 R |
| D108,814 S | * | 3/1938 | Aufiero | | 340/384.1 |
| D111,187 S | * | 9/1938 | Nielson | | 340/384.1 |
| D111,188 S | * | 9/1938 | Nielson | | 340/384.1 |
| D111,189 S | * | 9/1938 | Nielson | | 340/384.1 |
| 2,181,922 A | * | 12/1939 | Scofield | | G10K 9/15 |
| | | | | | 340/387.1 |
| D122,160 S | * | 8/1940 | Curtis | | 340/384.1 |
| 2,285,304 A | * | 6/1942 | Reck | | B60Q 5/00 |
| | | | | | 248/626 |
| D138,406 S | * | 8/1944 | Hadley | | D10/120 |
| 4,171,678 A | * | 10/1979 | Palm | | G10K 9/04 |
| | | | | | 116/142 FP |
| 5,078,074 A | * | 1/1992 | Gomez | | G10K 9/18 |
| | | | | | 116/137 R |
| 6,294,984 B1 | | 9/2001 | Meister | | |
| 7,617,794 B2 | * | 11/2009 | Chlystek | | G10K 9/22 |
| | | | | | 116/137 R |
| 7,712,430 B2 | * | 5/2010 | Solow | | G10K 9/04 |
| | | | | | 116/142 FP |
| 8,261,685 B2 | * | 9/2012 | Nishimoto | | B62J 3/00 |
| | | | | | 116/137 R |
| D763,717 S | * | 8/2016 | Chen | | D10/120 |

* cited by examiner

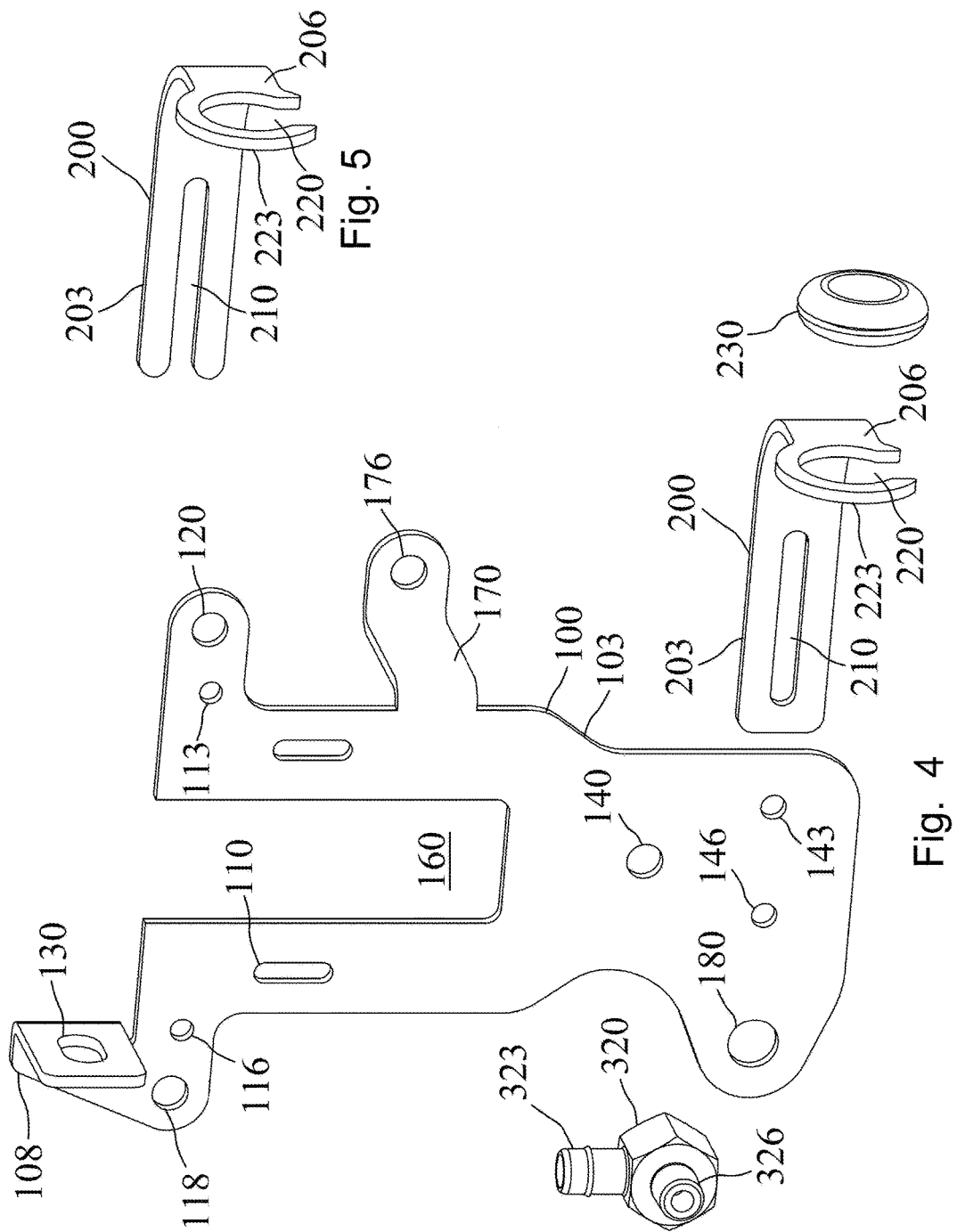

HORN SYSTEM

This application claims the benefit of provisional application No. 62/345,605 filed on Jun. 3, 2016 and entitled Horn System.

Horn systems described herein may be used with various motorcycles providing a secure modified horn system.

BRIEF DESCRIPTION OF THE DRAWINGS

FIG. 4 shows an exploded perspective view of mounting bracket components.
FIG. 5 shows a perspective view of a slidable bracket.

DETAILED DESCRIPTION

Example 1

Figure 1:
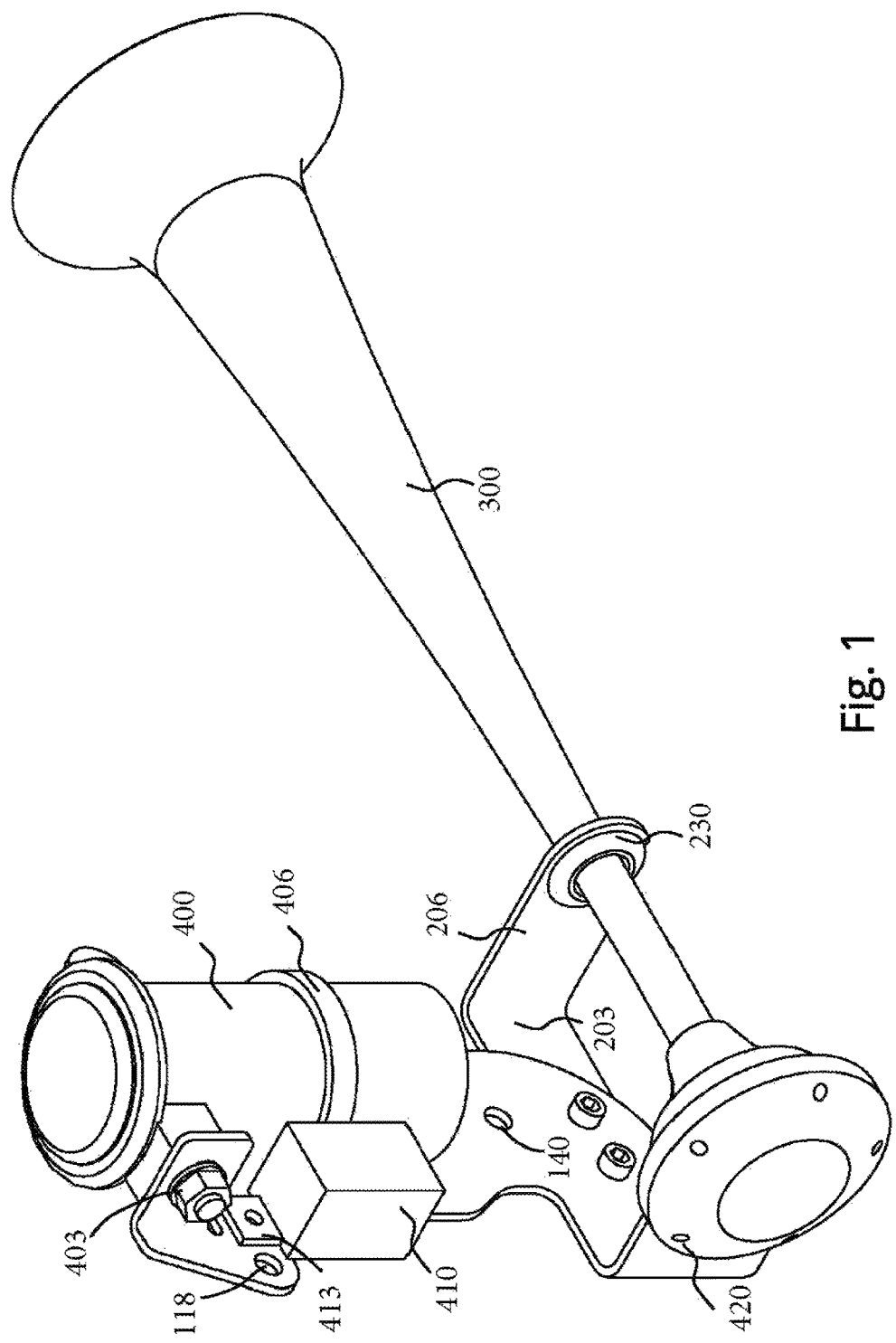
FIG. 1 shows a perspective view of a horn system.

An embodiment of a horn system as depicted in FIG. 1 includes Lower bracket mount bolt hole 140, Slide support sliding member 203, Slide support outward extension 206, Grommet 230, Horn 300, Compressor 400, Compressor fastener 403, Compressor securing strap 406, Relay 410, Relay mounting tab 413 and Horn body screw hole 420.

Figure 2:
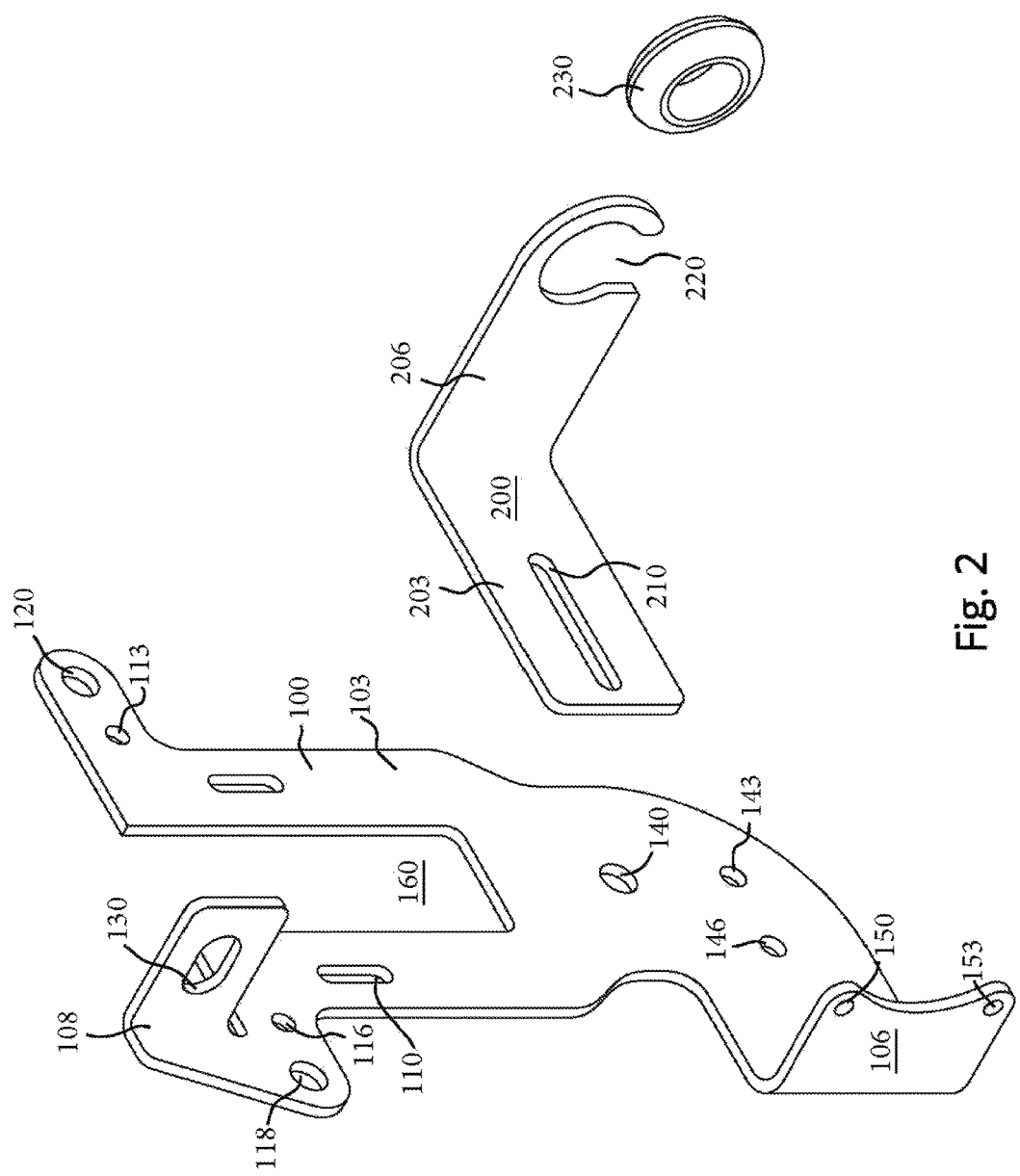
FIG. 2 shows an exploded perspective view of mounting bracket components.

Mounting bracket components of the embodiment depicted in FIG. 1 are shown in FIG. 2 with those components including Primary mounting bracket 100, U-shaped mounting plate 103, Horn mounting plate 106, Compressor mounting tab 108, Strap slots 110, First upper bracket relay mount screw hole 113, Second upper bracket relay mount screw hole 116, First upper bracket mount bolt hole 118, Second upper bracket mount bolt hole 120, Compressor bolt hole 130, Lower bracket mount bolt hole 140, First adjustment screw mounting hole 143, Second adjustment screw mounting hole 146, First horn mounting screw hole 150, Second horn mounting screw hole 153, Compressor opening 160, Slidable bracket 200, Slide support sliding member 203, Slide support outward extension 206, Adjustment screw slot 210, Horn grommet opening 220 and Grommet 230. Grommet 230 may be a split grommet to accommodate the insertion of the horn.

In one particular embodiment characteristic of Example 1, the mounting bracket may have the following features. The distance between the centerlines of First upper bracket relay mount screw hole 113 and Second upper bracket relay mount screw hole 116 may be 3⅛ inches. The distance between the centerlines of First upper bracket mount bolt hole 118 and Second upper bracket mount bolt hole 120 may be 4 5/16 inches. The width of Compressor opening 160 may be 1⅛ inches, 1⅜ inches or any width suitable for mounting a compressor. The height of Compressor opening 160 may be 3⅛ inches, 3 1/16 inches or any other height suitable for mounting a compressor. Depending on the application and the desired positioning of the compressor the width or other dimensions of Compressor opening 160 may be varied. For example, by narrowing the opening, the compressor may be positioned further outward from the vehicle. A larger compressor opening may allow for a compressor that is more recessed relative to the vehicle. The compressor may remain securely pressed into Compressor opening 160. The vertical separation between Lower bracket mount bolt hole 140 and either First upper bracket mount bolt hole 118 or First upper bracket relay mount screw hole 113 measured hole center to hole center may be 4 inches. The center of First upper bracket mount bolt hole 118 may be 1 7/16 inch from the top of the mounting bracket, 1⅜ inches from the top or other suitable separation distances. The center of Second adjustment screw mounting hole 146 may be ¾ inch or 7/16 inch from the bottom of the mounting bracket and First adjustment screw mounting hole 143 may be 1 inch or 11/16 inch away from Second adjustment screw mounting hole 146 measured center to center. Slide support sliding member 203 may have a length of 2 13/16 of an inch. Primary mounting bracket 100 and Slidable bracket 200 may be constructed from 12 gauge steel. In related embodiments, various other metals may be used. In further related embodiments, the metal may be at least 14 gauge metal and at most 10 gauge metal. Slidable bracket 200 may slide forward until Horn 300 is securely situated within Grommet 230 such that Horn 300 is securely fixed in place relative to Slidable bracket 200 and Primary mounting bracket 100. The ability to position and fix Slidable bracket 200 in a variety of places allows for the use of a variety of horns of various sizes and bell shapes. Screws or other fasteners may attach Horn 300 to Primary mounting bracket 100 through First horn mounting screw hole 150, Second horn mounting screw hole 153 and Horn body screw hole 420. The positioning of Strap slots 110, First upper bracket relay mount screw hole 113, Second upper bracket relay mount screw hole 116 and Compressor opening 160 allow for the easy changing of components such as the relay and the compressor without uninstalling the bracket.

Horn components, such as the horn, compressor and relay, may be weatherproof or waterproof components and may be marine grade components such as commercially available from the Sea-Dog Line Corporation of 3402 Smith Ave, Everett, Wash. 98201.

The configuration of the mounting bracket depicted in FIGS. 1 and 2 of the drawings is configured to mount to an Indian Chief motorcycle built by Indian Motorcycle International, LLC of 2100 Highway 55, Medina, Minn. 55340 such that the compressor would be situated within the existing motorcycle horn cover. The described embodiments may be further applied to other motorcycles from the same manufacturer with minor modification or no modification at all. Further, the described embodiments may be applied to motorcycles of different brands. Still further the described embodiments may be applied to vehicles more broadly including non-motorcycle vehicles.

The configuration of mounting brackets disclosed herein may allow for easy servicing and/or replacement of individual components. The bracket may be configured to support some or all of the components associated with an air horn system including horn, compressor and relay. The bracket may securely support the horn trumpet by utilizing rear and forward attachments that may be separated by at least two inches and at most 12 inches. The grommet may allow releasable attachment of the bracket to the horn bell without damaging the horn bell. The grommeted support cradle may fit securely around the horn trumpet eliminating movement and dampening vibration. The bracket with air horn components may be mounted in a small confined area. The low-profile design of the bracket system may also allow for installation on other vehicles such as under the hood on motor vehicles due to the reduced space requirement associated with the small mounting area requirement. The mounting bracket may be configured such that it does not extend laterally beyond the width of the compressor. In certain embodiments, it may be mounted on curved fender wells on motor vehicles or other non-planar mounting surfaces. Embodiments disclosed herein may allow for the secure support of long horn trumpet portions. Lengthy horns may be supported without the use of an independent horn bell support arm.

Example 2

Figure 3:
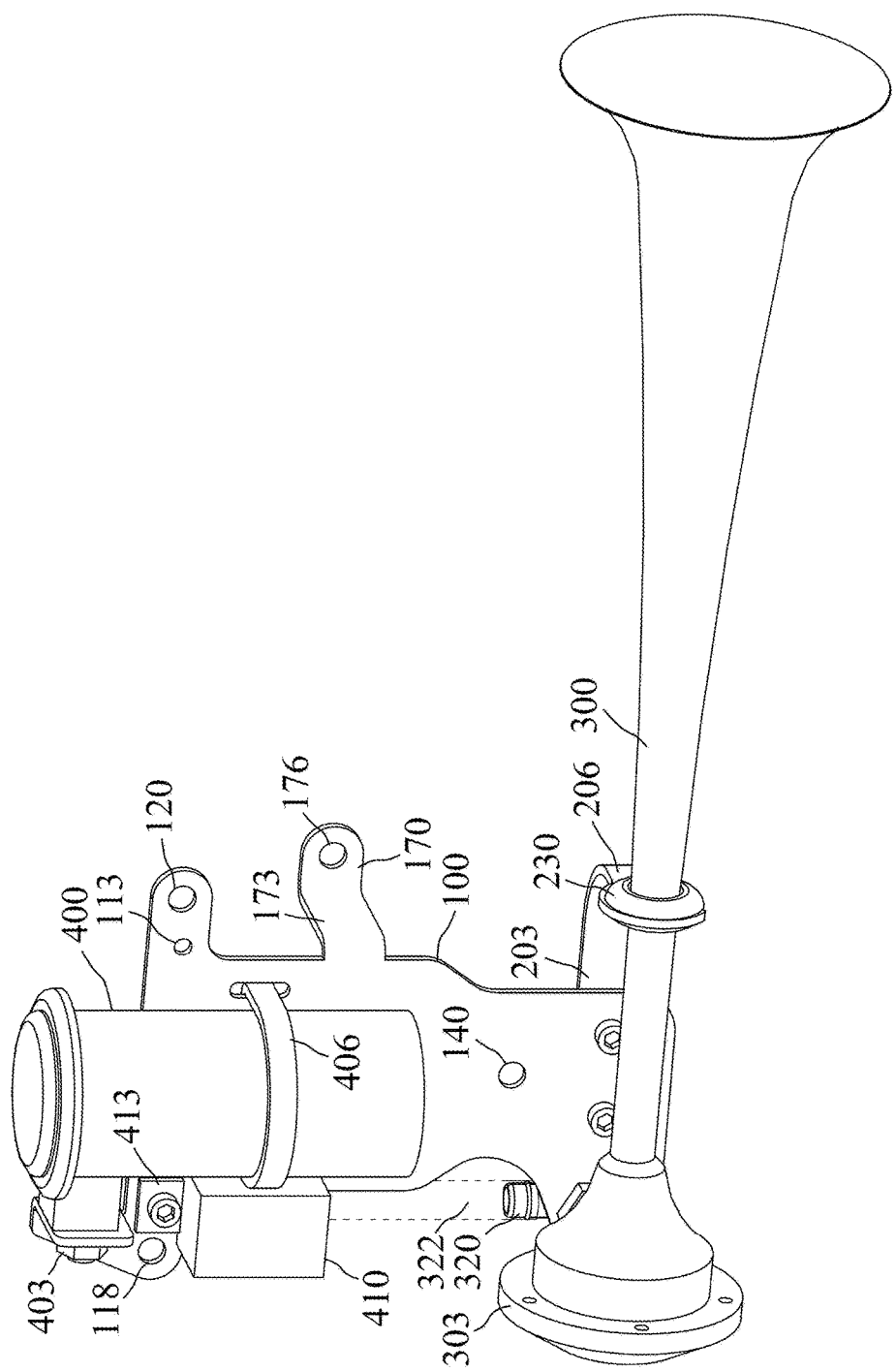
FIG. 3 shows a perspective view of a horn system.

FIGS. 3 and 4 depict another embodiment. Components such as Primary mounting bracket 100, U-shaped mounting plate 103, Compressor mounting tab 108, Strap slots 110, First upper bracket relay mount screw hole 113, Second upper bracket relay mount screw hole 116, First upper bracket mount bolt hole 118, Second upper bracket mount bolt hole 120, Compressor bolt hole 130, Lower bracket mount bolt hole 140, First adjustment screw mounting hole 143, Second adjustment screw mounting hole 146, Compressor opening 160, Slidable bracket 200, Adjustment screw slot 210, Horn grommet opening 220, Slide support sliding member 203, Slide support outward extension 206, Grommet 230, Horn 300, Horn diaphragm 303, Compressor 400, Compressor fastener 403, Compressor securing strap 406, Relay 410 and Relay mounting tab 413 function substantially as described in Example 1. Horn diaphragm 303 may connect directly to Through bracket horn mount fitting 320, for example, by Through bracket horn mount fitting 320 screwing directly into Horn diaphragm 303 through Primary mounting bracket 100 thereby securing Horn diaphragm 303 against Primary mounting bracket 100. Horn diaphragm 303 may connect to Compressor 400 by way of both Tubing 322 and Through bracket horn mount fitting 320. Recessed mounting tab 170 may attach to the motor in a plane behind that of the main portion of Primary mounting bracket 100 with Rearward extension portion 173 projecting roughly perpendicular to the main portion of Primary mounting bracket 100 and leading to Rear mount hole 176. Tubing (not shown) may extend between Through bracket horn mount fitting 320 and Compressor 400 supplying Horn diaphragm 303 with the air necessary for operation. Through bracket horn mount fitting 320 may have a Barbed tubing fitting 323 allowing easy tubing connection to Compressor 400 and a Male threaded end 326 for attaching to Horn diaphragm 303. The designation Horn diaphragm 303, indicates generally the portion of the horn that initially produces the sound rather than merely a diaphragm within that component. Horn diaphragm 303 is a sound unit. Other types of sound units may include electric sound units. Through bracket horn mount fitting 320 may be situated partially inside of Fitting mount hole 180 with Male threaded end 326 adjacent to Fitting mount hole 180. Horn grommet support ring 223 may be either a complete ring or a broken ring as shown in FIG. 4. Horn grommet support ring 223 may take the form of a broken ring when Horn 300 does not have a bell that is separable from the diaphragm and may be a complete ring in cases where the bell is detachable. First upper bracket relay mount screw hole 113 and Second upper bracket relay mount screw hole 116 may take on other shapes and sizes for the attachment of the relay such as slots. In slotted embodiments, the position of the relay or the position of fastener attaching the relay may be adjusted. The bell may be viewed as having both a tapered neck and a flared end. Horn grommet support ring 223 is positioned along the tapered neck of the bell of such that Horn grommet support ring 223 is contacting Horn 300, and in certain cases the tapered neck of Horn 300 may be frictionally fit within Horn grommet support ring 223. During the installation of Horn 300 Slidable bracket 200 may be slid along the tapered neck of Horn 300 until of Horn 300 is secured relative to Primary mounting bracket 100 at which point Slidable bracket 200 may be secured to Primary mounting bracket 100.

The bracket may securely support the horn trumpet by utilizing rear attachment points such as found at Through bracket horn mount fitting 320 and Horn mounting plate 106 and a forward attachments point such as Horn grommet support ring 223. The forward and rear attachment points may be separated by an attachment separation distance that may be between 2.0 and 8.0 inches, in many cases the separation may be between 3.5 and 6.5 inches, and may, for example, be 5.0 inches. Slidable bracket 200 may be bent either by the end user or be provided with a bend such that Horn 300 has a horizontal clearance from the remaining parts of the motorcycle. That horizontal clearance may, for example, be 0.5 inches with certain examples falling between 0.2 and 3.0 inches and a significant number of those examples falling between 0.4 and 1.8 inches.

Horn 300 may have a horn length representing the length of the horn along the axis of symmetry of the bell and that horn length may be between 5.4 and 25.6 inches, in many cases it may be between 11.2 and 20.8 inches and may, for example, be 16.0 inches. Even larger horns may be accommodated with due consideration of impacts on potential operation of the vehicle.

Slidable bracket 200 may have a bracket length that is approximately the length of or slightly greater than the length of Slide support sliding member 203. The Slidable bracket 200 bracket length may be between 1.3 and 7.5 inches, in many cases it may be between 2.2 and 4.2 inches and may, for example, be 3.2 inches.

The bends and dimensions of both Slidable bracket 200 and the mounting plate to which the horn diaphragm is attached may be configured to cause Horn 300 to depart from parallel to the orientation of the vehicle on which it is situated by 3° or less. In other embodiments, that departure from parallel may range from 3-25°.

In an alternate embodiment depicted in FIG. 5, Slidable bracket 200 may be configured such that Slide support sliding member 203 has an Adjustment screw slot 210 that is open on the end. In such embodiments, the horn bell may be removed easily by loosening fasteners that attach Slidable bracket 200 to Primary mounting bracket 100 and then removing both Slidable bracket 200 and the horn bell. Slidable bracket 200, Slide support sliding member 203, Slide support outward extension 206, Adjustment screw slot 210, Horn grommet opening 220 and Horn grommet support ring 223 would otherwise be unchanged in that embodiment.

Example 3

Embodiments such as described in Example 2 may be installed by bolting Primary mounting bracket 100 to the motor of a motorcycle such as the Indian Chief motorcycle at a position behind the horn cover mounts through Rear mount hole 176. A new two wire male plug connection may be connected into the existing motorcycle horn button/switch female plug connection followed by connecting new positive and negative wires to the corresponding motorcycle battery posts such that the original horn operating wiring controls the Relay 410 which provides power to Compressor 400 for the operation of Horn 300. The existing motorcycle horn cover can then be placed over the horn assembly at the three remaining bolt connections through First upper bracket mount bolt hole 118, Second upper bracket mount bolt hole 120 and Lower bracket mount bolt hole 140. In alternate embodiments, such as for certain motorcycles manufactured by Harley-Davidson Motor Company, as little as a single bolt may be used to mount Primary mounting bracket 100 to the motorcycle with adjustments being made to the positioning of the bolt holes as appropriate to fit the motorcycle.

The terms attach, attachment, attached and other variations of those terms, as used herein, connote a relatively close relationship of attachment that may include fasteners, fittings and the like as part of the attachment relationship. However, those terms are not intended to be construed in a way that encompasses major components such as the brackets, the compressor, the sound unit, the tapered neck or the flared end of the bell. For example, in the embodiments depicted in FIGS. 1, 2 and 3, Primary mounting bracket 100 is attached to Horn diaphragm 303 regardless of whether that attachment is made with fasteners or fittings. Conversely, the term attached is not intended to encompass indirect attachment such as the relationship of the bell of Horn 300 to Primary mounting bracket 100.

The term "sheet metal" as used herein is intended to encompass plate metal. The phrase "substantially planar" as used herein indicates an object or component lies entirely within 5 object thicknesses of a single plane. For example, a stamped ⅛-inch piece of sheet metal would be substantially planar if no part of that piece of sheet metal were more than ⅝ of an inch away from a single plane.

Horn systems described herein may, for example, comprise a first bracket; a second bracket; a compressor; a horn comprising a sound unit and a bell; and a length of tubing; such that the bell comprises a tapered neck; the length of tubing connects the compressor to the sound unit; the second bracket is arranged and configured for attachment to the first bracket at multiple positions relative to the first bracket; the sound unit is removably attached to the first bracket; and the second bracket is configured to surround the tapered neck. In a related example, the first bracket may be constructed of sheet metal and the second bracket may be constructed of sheet metal. In a related example, the second bracket may be configured to be releaseably and securely fastened to the first bracket. In a related example, the tapered neck may be constrained against movement by an opening in the second bracket. In a related example, the tapered neck may be constrained against movement by a friction fit of the tapered neck within the second bracket. In a further related example, the second bracket may be configured to be loosely secured against the first bracket such that the second bracket may engage in linear slidable motion relative to the first bracket. In a further related example, a grommet may contact the tapered neck and the second bracket. In a further related example, a relay may be attached to the first bracket. In a further related example, the first bracket may be fastened to a motorcycle at least one point. In a still further related example, the first bracket may comprise a U-shaped cutout and the compressor may be situated within the U-shaped cutout.

The above-described embodiments have a number of independently useful individual features that have particular utility when used in combination with one another including combinations of features from embodiments described separately. There are, of course, other alternate embodiments which are obvious from the foregoing disclosed descriptions, which are intended to be included within the scope of the present disclosure.

What is claimed is:

1. A horn system comprising:
    a. a first bracket;
    b. a second bracket;
    c. a compressor;
    d. a horn comprising a sound unit and a bell; and
    e. a length of tubing;
    f. wherein the bell comprises a tapered neck;
    g. wherein the length of tubing connects the compressor to the sound unit;
    h. wherein the second bracket is arranged and configured for attachment to the first bracket at multiple positions relative to the first bracket;
    i. wherein the sound unit is removably attached to the first bracket;
    j. wherein the second bracket is configured to surround the tapered neck;
    k. wherein the second bracket is arranged and configured to engage in sliding motion along the bell within a linear range of motion such that the second bracket may engage in linear slidable motion relative to both the horn and the first bracket;
    l. wherein the second bracket is configured to attach to the first bracket at any point within the linear range of motion and
    m. wherein the tapered neck is constrained against movement by a friction fit of the tapered neck within the second bracket which occurs at a first end of the linear range of motion.

2. The horn system of claim 1 wherein the first bracket is constructed of sheet metal and the second bracket is constructed of sheet metal.

3. The horn system of claim 1 wherein the second bracket is configured to be releaseably and securely fastened to the first bracket.

4. The horn system of claim 1 wherein the tapered neck is constrained against movement by an opening in the second bracket.

5. The horn system of claim 1 wherein a grommet contacts the tapered neck and the second bracket.

6. The horn system of claim 1 further comprising a relay attached to the first bracket.

7. The horn system of claim 1 wherein the first bracket is fastened to a motorcycle at least one point.

8. The horn system of claim 1 wherein the first bracket comprises a U-shaped cutout and wherein the compressor is situated within the U-shaped cutout.

* * * * *